Patented July 18, 1950

2,515,246

UNITED STATES PATENT OFFICE 2,515,246

POLYFLUORO ALIPHATIC DIAMINES

Earl T. McBee, La Fayette, Ind., and Park A. Wiseman, Akron, Ohio, assignors to Purdue Research Foundation, La Fayette, Ind., a corporation of Indiana No Drawing. Application July 30, 1946,
Serial No. 687,225

3 Claims. (Cl. 260—583)

The present invention relates to difluoromethylene compounds. More specifically, the invention relates to certain derivatives of perfluorodicarboxylic acids having the formula:

$$HO_2C—(CF_2)_x—CO_2H$$

wherein $x$ is an integer from two to four, inclusive.

The group of compounds with which the present invention is concerned are all related, being members of the series embodying the following general structure:

wherein $x$ is an integer from two to four, inclusive. This structure may also exist in the form $N{\equiv}C—(CF_2)_x—C{\equiv}N$.

The compounds of the present invention may be prepared from the same parent compounds, the perfluorodicarboxylic acids. The preferred embodiment of the invention resides in members of the series of compounds embodying the above general structure and is inclusive of the following related types:

(1) Amides of the general formula $$H_2N—CO—(CF_2)_x—CO—NH_2$$

(2) Nitriles of the general formula $$N{\equiv}C—(CF_2)_x—C{\equiv}N$$

(3) Amines of the general formula $$H_2N—CH_2—(CF_2)_x—CH_2—NH_2$$
$$RHN—CH_2—(CF_2)_x—CH_2—NHR \text{ and}$$
$$R_2N—CH_2—(CF_2)_x—CH_2—NR_2$$

wherein R is a hydrocarbon radical; and acid or quaternary salts thereof, (4) Acylamines of the general formula

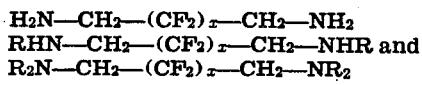

wherein

represents the residue of a mono- or dicarboxylic acid, and (5) Dihydrazides of the general formula $$H_2N—NH—CO—(CF_2)_x—CO—NH—NH_2$$

In all of the above formulae, $x$ represents an integer from two to four, inclusive.

It is an object of the present invention to provide new compounds which are useful as chemical intermediates.

The compounds, in general, may be prepared from the corresponding perfluorodicarboxylic acid. Thus, we first prepare a diester of the selected dicarboxylic acid, for example, the diethyl ester of perfluoroglutaric acid, having the formula $$C_2H_5—OCO—(CF_2)_3—OCO—C_2H_5$$

by treatment of the acid with the selected alcohol in the presence of a small amount of hydrochloric acid catalyst. After a considerable reflux period, e. g., 10 to 20 hours, excess alcohol is removed and the diester, usually a high-boiling liquid, is recovered. The diester may then be used to prepare the diamide.

The selected diester of the chosen perfluorodicarboxylic acid is introduced, with a suitable organic solvent, e. g., diethyl ether, into apparatus fitted with a gas inlet, and the solution is treated at low temperatures, preferably at about zero degrees centigrade, with anhydrous gaseous ammonia. Sufficient ammonia to convert the ester to the diamide is bubbled into the reaction mixture. The diamide usually separates as a white solid.

The diamide may then be thoroughly admixed with an excess of phosphorus pentoxide, and the mixture heated until the dinitrile distills from the reaction container.

To prepare the diacyl derivatives of the diamines, the following procedure may be employed: The perfluoro nitrile, the selected acid or acid anhydride, such as acetic acid or propionic anhydride, a small amount of platinum oxide catalyst, and an organic solvent, e. g., ethyl ether, are introduced into a pressure hydrogenator. Hydrogen is introduced until a suitable pressure, e. g., 1000 p. s. i., is attained; the bomb is heated to about 100 degrees centigrade and maintained at this temperature for a suitable period, e. g., about one hour. After cooling slowly to room temperature and preferably with agitation, the excess hydrogen is allowed to escape. The diacyl derivative of the diamine is usually separated from the hydrogenator as a crude slurry, which may be recrystallised from an organic solvent such as benzene, alcohol, or mixtures thereof. The acyl derivatives prepared in this manner are usually white crystalline solids, having a definite melting point after recrystallisation.

Representative acylamines which may be prepared in this manner include the diacetyl, dipropionyl, dibutyryl, diisobutyryl, divaleryl, dicapronyl, distearyl and many other acyl derivatives of the diamines.

Salts of the diamines having the general formula $=N-CH_2-(CF_2)_x-CH_2-N=$, wherein $x$ is an integer from two to four, inclusive, may be prepared by treatment of the corresponding diamine diacyl derivative with a selected acid. The hydrolysis product, the diamine hydrochloride, sulphate, et cetera, is usually a crystalline solid after recrystallisation from ethyl ether. The salts of the diamine may be varied widely, and may be the hydrochloride, hydrobromide, sulphate, citrate, tartrate, acetate, et cetera, depending upon the acid used for the hydrolysis of the acyl derivative.

The free basic diamine may be prepared from the salts thereof by treatment with a base, such as dilute sodium hydroxide solution. The basic solution may be extracted with ether or other suitable organic solvent. The extract is dried, filtered, and the solvent removed. The amine remains as a heavy oil or a crystalline solid and may be purified by distillation under reduced pressure. The pure amine is usually a stable solid with a definite melting point.

Salts of other acids and quaternary salts may be prepared from the free base, by treatment with the selected acid, alkyl halide, or arylsulfonic ester. Thus, besides acid salts, may be produced the methobromide, ethochloride, ethyl (para-toluene) sulfonate, et cetera.

Within the scope of the present invention are included amines of the formulas $$RNH-CH_2-(CF_2)_x-CH_2-NHR$$

and $$R_2N-CH_2-(CF_2)_x-CH_2-NR_2$$

wherein $x$ is an integer from two to four, inclusive, and wherein R represents various hydrocarbon radicals. These compounds may be prepared by reaction of the selected alkyl halide with the primary or secondary amine at moderately elevated temperatures, by which method the hydrohalide salt of the secondary or tertiary amine is produced. The free base may then be liberated by treatment of the salt with a moderately strong basic solution. Representative secondary and tertiary amines are $CH_3NHCH_2-(CF_2)_3-CH_2NHCH_3$
$CH_3NHCH_2-(CF_2)_4-CH_2NHCH_3$
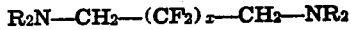
$(CH_3)_2CHNHCH_2-(CF_2)_2-CH_2NHCH(CH_3)_2$
$(n-C_8H_{17})_2NCH_2-(CF_2)_3-CH_2N(n-C_8H_{17})_2$
$(CH_3)(C_4H_9)NCH_2-(CF_2)_4-CH_2N(CH_3)(C_4H_9)$
$C_6H_{11}NHCH_2-(CF_2)_3-CH_2NHC_6H_{11}$
$(C_6H_5)(CH_3)NCH_2-(CF_2)_3-CH_2N(CH_3)(C_6H_5)$ and so forth.

By the reaction of a selected diester of a perfluorodicarboxylic acid and hydrazine hydrate may be produced the corresponding dihydrazide. The dihydrazide is formed as a white, crystalline solid and may be recrystallised from water.

Several perfluorodicarboxylic acids from which members of this new group of compounds may be produced and methods for their preparation are disclosed in our copending applications Serial 625,108, filed October 27, 1945, and now Patent No. 2,453,146, and Serial 633,542, filed December 7, 1945, and now abandoned. Other perfluorodicarboxylic acids may be prepared by the same methods and in the following manner:

(a) 1,1-dichloro-2,2-difluoroethylene is dimerized at about 200 degrees centigrade to yield 1,1,2,2-tetrachloro-3,3,4,4-tetrafluorocyclobutane, boiling at about 131 degrees centigrade.

(b) The cyclobutene is dehalogenated with zinc to give 1,2-dichloro-3,3,4,4-tetrafluorocyclobutene, boiling at about 66 degrees centigrade.

(c) The cyclobutene is oxidized, e. g., with potassium permanganate, to perfluorosuccinic acid, $HOOC-(CF_2)_2-COOH$, having a boiling point of about 120 degrees centigrade. Further disclosure of this process may be obtained from the I. G. Farbenindustrie Research Reports of the Frankfurt-Hochst works for 1943, Microfilm Number 6 of 1943 material.

Further disclosure of esters of perfluoroadipic acid, which are useful in the preparation of some of the compounds of the present invention is found in our copending application Serial 687,226.

The compounds of the present invention possess the structure:

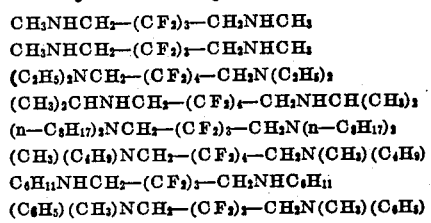

wherein $x$ is an integer from two to four, inclusive. The preferred embodiment of the invention resides in those compounds which possess the above general structure and which are selected from the group consisting of diamides, dinitriles, di(acylamines), dihydrazides, diamines and salts of diamines.

*Example 1.—Diamide of perfluoroadipic acid*

Fifty grams of the diethyl ester of perfluoroadipic acid, prepared by the condensation of perfluoroadipic acid, (as disclosed in our copending application Serial 625,108, filed October 27, 1945) and ethanol in the presence of hydrochloric acid, and boiling at 70.0 to 71.0 degrees centigrade at 2-3 millimeters of mercury pressure absolute, was introduced with 200 milliliters of anhydrous ethyl ether into a one-liter, three-neck flask fitted with reflux condenser, thermometer and a gas inlet. Anhydrous gaseous ammonia was bubbled through the solution at zero degrees centigrade as long as it was absorbed, and the diamide separated. The solvent was removed by evaporation, leaving 41 grams of a white product. A sample of the material melted at 237 degrees centigrade, uncorrected, and no change in the melting point occurred upon recrystallization from benzene. Analysis:

|  | Fluorine Content | |
|---|---|---|
|  | Found | Calculated |
|  | Per Cent | Per Cent |
| Diamide of perfluoroadipic acid, $H_2NOC-(CF_2)_4-CONH_2$ | 54.1 | 52.9 |

*Example 2.—Perfluoroadiponitrile*

Fifty grams of phosphorus pentoxide and 20 grams of the diamide of perfluoroadipic acid were added to a round-bottom distilling flask of 250 milliliters capacity. After intimate mixing of the reactants, a Bunsen burner was employed to heat the mixture to the fusion point. Upon further heating of the mixture, 11 grams of low-boiling, colorless liquid was distilled from the reaction flask. The product, perfluoroadiponitrile, boils at about 63 degrees centigrade, is water-insoluble, and possesses little odor. The vapors of the product, however, appear to be nauseating and to have an adverse effect upon the respiratory system. Analysis:

|  | Fluorine Content | |
|---|---|---|
|  | Found | Calculated |
| Perfluoroadiponitrile, $N\equiv C-(CF_2)_4-C\equiv N$ | Per Cent 61.2 | Per Cent 60.9 |

*Example 3.—Diacetyl derivative of 2,2,3,3,4,4,5,5-octafluoro-1,6-hexanediamine*

Twenty grams of perfluoroadiponitrile, 25 grams of acetic anhydride, one gram of platinum oxide catalyst and 100 milliliters of anhydrous ethyl ether were added to a 500-milliliter Parr bomb hydrogenator. Hydrogen was introduced until a pressure of 1000 p. s. i. was obtained. The sealed bomb was heated rapidly, with shaking, to 100 degrees centigrade, maintained at this temperature for one hour and allowed to cool slowly, with shaking, to room temperature. The excess hydrogen was allowed to escape from the cooled bomb, and the gray slurry which comprised the reaction product was placed in ice-water. Thirty grams of gray solid was collected and recrystallised from benzene and alcohol. The resulting white product weighed 10 grams and, after repeated recrystallisations from benzene-alcohol and alcohol-water solutions, melted sharply at 180–181 degrees centigrade. Analysis:

|  | Fluorine Content | |
|---|---|---|
|  | Found | Calculated |
| Diacetyl derivative of 2,2,3,3,4,4,5,5-octafluoro-1,6-hexanediamine, $CH_3CONH-CH_2-(CF_2)_4-CH_2-NHCOCH_3$ | Per Cent 45.9 | Per Cent 44.1 |

*Example 4.—2,2,3,3,4,4,5,5-octafluoro-1,6-hexanediamine salts*

One and one-half grams of the diacetyl derivative of 2,2,3,3,4,4,5,5-octafluoro-1,6-hexanediamine was added to a 100-milliliter round-bottom flask containing 50 milliliters of 20 per cent sulfuric acid solution. The resulting solution was refluxed for 15 hours. Upon cooling, a crystalline white product weighing 1.5 grams separated therefrom. This product, when dry, decomposed when an attempt was made to determine its melting point. Analysis:

|  | Fluorine Content | |
|---|---|---|
|  | Found | Calculated |
| 2,2,3,3,4,4,5,5-Octafluoro-1,6-hexanediamine sulphate, $H_2N-CH_2-(CF_2)_4-CH_2-NH_2.H_2SO_4$ | Per Cent 41.5 | Per Cent 42.4 |

The amine sulfate from the above example was dissolved in sodium hydroxide solution, extracted with ethyl ether, and hydrogen chloride was passed into the dry extract. The hydrochloride separated and was collected.

The diamine hydrochloride prepared as above melted above 250 degrees centigrade. Analysis:

|  | Per Cent Fluorine | | Per Cent Chlorine | |
|---|---|---|---|---|
|  | Found | Calc'd | Found | Calc'd |
| 2,2,3,3,4,4,5,5-Octafluoro-1,6-hexanediamine Hydrochloride, $H_2N-CH_2-(CF_2)_4-CH_2-NH_2.2HCl$ | 45.9 | 45.6 | 21.0 | 21.3 |

*Example 5.—2,2,3,3,4,4,5,5-octafluoro-1,6-hexanediamine*

Fourteen grams of the diacetyl derivative of 2,2,3,3,4,4,5,5-octafluoro-1,6-hexanediamine, 250 grams of water and 62 grams of concentrated sulfuric acid were added to a 500-milliliter round-bottom flask fitted with a reflux condenser. The resultant mixture was refluxed for 18 hours, although the hydrolysis occurred quite readily and in a shorter time than the total reflux period. The reaction product was cooled, whereupon a crystalline white solid separated. This product, weighing 15 grams after drying, was assumed to be the monosulfate of 2,2,3,3,4,4,5,5-octafluoro-1,6-hexanediamine.

The sulfate was placed in 200 milliliters of water and dilute sodium hydroxide solution was added slowly until the solution was slightly basic. As the sodium hydroxide was added, the sulfate dissolved and a dark red oil separated. The basic solution was extracted with three 100-milliliter portions of ethyl ether. The ether extract was dried over calcium sulfate, filtered, and the ether evaporated. A light brown liquid which crystallised upon standing remained. The solid possessed an amine-like odor.

The impure amine was distilled under reduced pressure and 5.5 grams of white crystalline product, boiling at 65–66 degrees centigrade at 5–6 millimeters of mercury pressure absolute, was collected. The solid melted at 44–45 degrees centigrade and was unusually stable to light and air. Analysis:

|  | Fluorine Content | |
|---|---|---|
|  | Found | Calculated |
| 2,2,3,3,4,4,5,5-Octafluoro-1,6-hexanediamine, $H_2N-H_2C-(CF_2)_4-CH_2-NH_2$ | Per Cent 59.2 | Per Cent 58.5 |

*Example 6.—Diamide of perfluoroglutaric acid*

Anhydrous ethyl ether (500 milliliters) and 125 grams of the diethyl ester of perfluoroglutaric acid (prepared from perfluoroglutaric acid and ethanol in the presence of concentrated hydrochloric acid; B. P. 76 degrees centigrade at 5 millimeters of mercury pressure absolute, $n_D^{26}$ 1.3577) were added to a one-liter, three-neck flask fitted with a gas-inlet tube. The resulting solution was cooled to zero degrees centigrade, anhydrous ammonia introduced, and the amide separated. The ether-alcohol mixture was removed, yielding 96 grams of the white diamide residue. Analysis:

| | Fluorine Content | |
|---|---|---|
| | Found | Calculated |
| Diethyl ester of perfluoroglutaric acid, $C_2H_5OCO-(CF_2)_3-COOC_2H_5$ | Per Cent 38.7 | Per Cent 38.5 |
| Diamide of perfluoroglutaric acid, $NH_2\overset{O}{\overset{\|}{C}}-(CF_2)_3-\overset{O}{\overset{\|}{C}}NH_2$ | 49.4 | 47.9 |

Example 7.—Perfluoroglutaronitrile

Phosphorus pentoxide (225 grams) and 96 grams of the diamide of perfluoroglutaric acid were added to a round-bottom distilling flask of 500 milliliters capacity. The reactants were mixed thoroughly, whereafer the flask and contents were immersed in an oil bath at 180–200 degrees centigrade for four hours. The oil bath was then removed and further heating continued with a Bunsen burner. The colorless liquid which distilled from the flask weighed 36 grams and yielded, upon redistillation, two fractions, boiling at about 40 and about 158 degrees centigrade. The first fraction (13 grams) had a boiling point of 38 degrees centigrade at 745 millimeters of mercury pressure absolute and was identified as perfluoroglutaronitrile. Analysis:

| | Fluorine Content | |
|---|---|---|
| | Found | Calculated |
| Perfluoroglutaronitrile, $N{\equiv}C-(CF_2)_3-C{\equiv}N$ | Per Cent 56.9 | Per Cent 55.4 |

Example 8.—2,2,3,3,4,4-hexafluoro-1,5-pentanediamine

Fifty grams of powdered perfluoroglutaric acid diamide and 225 grams of phosphorus pentoxide were added to a one-liter, round-bottom, distilling flask and the reactants mixed intimately. The resultant mixture was heated with a Tirril burner and the distillate condensed in an ice-water-cooled receiver.

A second experiment, identical with that just described, was performed. The combined product from the two experiments weighed 63 grams, and, when distilled at atmospheric pressure, yielded 24 grams of perfluoroglutaronitrile and 32 grams believed to be perfluoroglutarimide, boiling at 155–159 degrees centigrade, which was formed by the splitting of ammonia from perfluoroglutaramide.

Twenty-four grams of perfluoroglutaronitrile, 1 gram of platinum oxide catalyst, 25 grams of acetic anhydride, and sufficient ethyl ether to give a volume of 150 milliliters were introduced into a Parr bomb. Hydrogen was then introduced until a pressure of 1000 p. s. i. was attained. The sealed bomb was heated with shaking to 110 degrees centigrade, cooled slowly to 60 degrees centigrade and allowed to remain at this temperature under 1000 p. s. i. hydrogen pressure over night. It was thereafter cooled to room temperature and the excess hydrogen bled therefrom. The reaction product was filtered to remove excess catalyst, and the filtrate evaporated slowly. The remaining oily product was poured into 400 milliliters of 20 per cent sulfuric acid solution, and the resulting mixture was refluxed overnight. The hydrolysis product was cooled to room temperature, decolorized with activated carbon, filtered, made alkaline with sodium hydroxide solution, and the basic solution extracted with four 100-milliliter portions of ethyl ether. The extract was dried over calcium sulfate, filtered, and distilled. A red oil with an amine-like odor remained in the flask. This was identified as 2,2,3,3,4,4-hexafluoro-1,5-pentanediamine.

Example 9.—Dihydrazide of perfluoroadipic acid

Ten milliliters (14 grams; 0.04 mole) of the diethyl ester of perfluoroadipic acid, 75 milliliters of absolute ethyl alcohol and 20 milliliters of 42 per cent hydrazine hydrate in water were mixed together at room temperature. The white, crystalline hydrazide formed in about twenty minutes and was suction filtered, washed with dry ether and recrystallised from boiling water. The yield was 9 grams (76 per cent of theory); melting point 186 to 187 degrees centigrade.

We claim:

1. A diamine having the general formula $$H_2N-CH_2-(CF_2)_x-CH_2-NH_2$$

wherein $x$ is an integer from 2 to 4, inclusive.

2. 2,2,3,3,4,4-hexafluoro - 1,5 - pentanediamine, of the formula $H_2N-CH_2-(CF_2)_3-CH_2-NH_2$.

3. 2,2,3,3,4,4,5,5-octafluoro-1,6-hexanediamine, of the formula $H_2N-CH_2-(CF_2)_4-CH_2-NH_2$.

EARL T. McBEE.
PARK A. WISEMAN.

REFERENCES CITED

The following references are of record in the file of this patent:

UNITED STATES PATENTS

| Number | Name | Date |
|---|---|---|
| 2,351,602 | D'Alelio | June 20, 1944 |
| 2,409,315 | Rigby et al. | Oct. 15, 1946 |
| 2,411,159 | Hanford | Nov. 19, 1946 |
| 2,426,224 | Kharasch | Aug. 26, 1947 |
| 2,438,484 | Henne | Mar. 23, 1948 |

OTHER REFERENCES

Swarts, "Chem. Abstracts," 17, 769 (1923), Abstracting article in Bull. Sci. Acad. Roy. Belg., 8, 343–370 (1922).

Perkin & Kipping, "Organic Chemistry (3rd ed., 1941, p. 199).

Gilman et al., "Jour. Am. Chem. Soc.", vol. 65, pp. 1458–1460 (1943).

Henne et al., "J. Am. Chem. Soc.", vol. 67, 1235–1237 (August 9, 1945).